United States Patent [19]

Kobayashi et al.

[11] 3,878,512

[45] Apr. 15, 1975

[54] DATA TRANSMITTING SYSTEM

[75] Inventors: Shinzo Kobayashi; Takahisa Oota, both of Amagasaki, Japan

[73] Assignee: Mitsubishi Denki Kabushiki Kaisha, Tokyo, Japan

[22] Filed: Aug. 29, 1973

[21] Appl. No.: 392,532

[30] Foreign Application Priority Data

Aug. 29, 1972 Japan .............................. 47-86527

[52] U.S. Cl. ......................... 340/168 R; 179/15 BA

[51] Int. Cl. ........................... H04q 9/00; H04j 3/00

[58] Field of Search .... 179/15 BA; 340/163, 147 R, 340/147 LP, 168 R

[56] References Cited

UNITED STATES PATENTS

| | | | |
|---|---|---|---|
| 3,394,349 | 7/1968 | Day | 340/163 |
| 3,639,904 | 2/1972 | Arulpragasam | 340/147 LP |
| 3,644,678 | 2/1972 | Schmidt | 179/15 BA |
| 3,647,977 | 3/1972 | Closs | 179/15 BA |
| 3,699,522 | 10/1972 | Haner, Jr. | 340/163 |

OTHER PUBLICATIONS

Lebizay et al., Transmission Line Procedure, IBM Tech. Disclosure Bulletin, Vol. 11, No. 9, 02-1969, pgs. 1120-1122.

*Primary Examiner*—Donald J. Yusko
*Attorney, Agent, or Firm*—Oblon, Fisher, Spivak, McClelland & Maier

[57] ABSTRACT

A data transmission system and method wherein a plurality of terminal stations transmit data to a central office by using a common line or channel. When more than one of said terminal stations simultaneously transmit data to the central office, a second data transmission is originated from each of the simultaneously transmitting terminal stations. A time delay is interposed between the retransmissions from the several terminal stations and is repeated a sufficient number of times to prevent simultaneous calls from the plurality of terminal stations. Several methods are presented for providing the time delay. For example, the time delay can correspond to the address number of the terminal station, can be randomly generated, or can be set by a pseudo-noise pulse sequence (PN-sequence).

18 Claims, 5 Drawing Figures

DATA TRANSMITTING SYSTEM

BACKGROUND OF THE INVENTION

1. Field of the Invention

This invention relates to a data transmission system for transmitting data between a central office and a plurality of terminal stations.

2. Description of the Prior Art

In a data system which comprises a central office having data transmission equipment, a communication controller, a central processor, and a plurality of terminal stations each having data transmission equipment and terminal apparatus which calls (transmits data) randomly, it is usually not preferable to provide a single independent transmission line or channel (one line, one frequency channel or one time slot) for each of the terminal stations due to the low efficiency of use of such a channel when the number of terminal stations is large and the traffic of each terminal station (calling rate x average holding time) is low.

In such a case, one or a plurality of transmission lines (or channels) is commonly given to all of the terminal stations or to each group of the terminal stations, so that many terminal stations commonly utilize a small number of transmission lines (or channels), thereby increasing the efficiency of use of the transmission lines (or channels).

SUMMARY OF THE INVENTION

It is therefore an object of this invention to provide a data transmission system which utilizes a common transmission line (or channel).

Another object of the present invention is to provide a data transmission system and method which utilizes a common line or channel between the central office and a plurality of terminal stations and wherein simultaneous calls from more than one of such terminal stations can be prevented.

The foregoing and other objects are attained in accordance with one aspect of the present invention through the provision of a system and method for transmitting data from a plurality of terminal stations to a central office by using a common line or channel, wherein the simultaneous transmission of data from more than one of the terminal stations is prevented by providing a retransmission of said data from the terminal stations with a predetermined or random time delay between the retransmission from the various terminal stations. The terminal stations cease retransmission upon the receipt from the central office of a confirmation signal signifying accurate reception of data. The time delay can correspond variously to the address numbers of the terminal stations, to the output of a random code generator, or to the output of a pseudo-noise pulse generator (PN-sequence generator) located in each terminal station.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DESCRIPTION OF THE PREFERRED EMBODIMENTS

Figure 1:
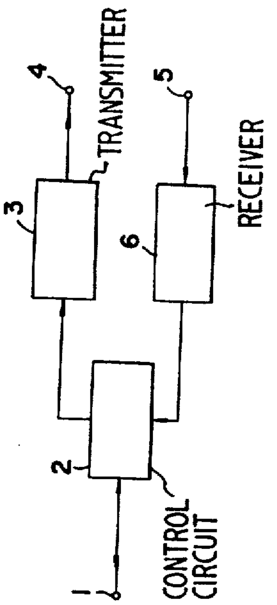
FIG. 1 is a block diagram of one embodiment of data transmission equipment in a terminal station according to the present invention.

Referring now to the drawings, wherein like reference numerals designate identical or corresponding parts throughout the several views, and more particularly to FIG. 1 thereof, one embodiment of the data transmission equipment in a terminal station according to the invention is shown as comprising a terminal 1 connected to the terminal apparatus in the terminal station, a control circuit 2, a transmitter or a modulator 3, a transmitter output terminal 4, a receiver input terminal 5, and a receiver or demodulator 6. In FIG. 1, although only one terminal 1 is shown, it is understood that a plurality of such terminals may be utilized. Also, the transmission output terminal 4 and the receiver input terminal 4 are shown separately, however one terminal can be commonly used.

When a transmission demand from the terminal apparatus is applied through the terminal 1 to the control circuit 2, the latter actuates the transmitter 3. A signal of "transmittable" is then returned through the terminal 1 to the terminal apparatus, and subsequently data fed from the terminal apparatus through the terminal 1 is transmitted from the transmitter 3 through the transmission output terminal 4 to the central office. The data contains the address of the terminal station and checkbits for error detector or correction. When the central office accurately receives the data from the terminal station without a failure, a confirmation signal including the address of the terminal station is returned. The confirmation signal is received through the receiver input terminal 5 by the receiver 6 so as to transmit it to the control circuit 2. The control circuit 2 determines whether or not it is a confirmation signal to its own station. If it is detected as the confirmation signal to its own station, a signal of "complete transmission" is transmitted through the terminal 1 to the terminal apparatus, and the calling operation is completed.

The transmission demand on each of the terminal stations is random. Accordingly, when a plurality of terminal stations commonly use a relatively small number of lines or channels, sometimes the data is simultaneously originated from a plurality of terminal stations, whereby the data is not accurately received in the central office. Several of the following methods exist for decreasing the probability of simultaneous callings from a plurality of terminal stations. However, they are incomplete in that it is impossible to completely prevent simultaneous callings.

1. "Method of preventing a calling from terminal stations other than an addressed station by placing an address at the beginning of the data (just after the synchronizing signal) and returning the address when the central office receives the address, in a data format given from the terminal station."

In accordance with this method, it is hard to prevent a calling from other terminal stations before the central office receives the address.

2. "Method of preventing a calling from terminal stations other than a transmitting terminal station by returning a busy signal immediately when the signal originated from the terminal station is detected by the central office."

In accordance with this method, it takes a relatively long time for detecting the signal originated from the terminal station by the central office or for detecting the busy signal originated from the central office by the terminal station. It is impossible to prevent a calling of the other terminal stations during that time.

3. "Method of preventing a calling during the time of detecting a signal originated from the other terminal stations by a monitor receiver, wherein the terminal station is equipped with the monitor receiver for monitoring a transmission channel together with a receiver for receiving a signal originated from the central office."

In accordance with this method, it takes a relatively long time for detecting the signal originated from the other terminal stations by the monitor receiver. It is impossible to prevent a calling of the other terminal stations during that time.

4. "Method of preventing a calling of the terminal stations which are not allowed to call by transmitting a busy signal from the central office and transmitting data from only one station which is allowed to call, by receiving a response signal from the central office by requesting an allowance of the calling from the terminal station to the central office by transmitting a ringing signal before transmitting the data."

In accordance with this method, simultaneous callings from a plurality of the terminal stations can be prevented. However, it is impossible to prevent simultaneous ringings from a plurality of the terminal stations. When the central office could not accurately receive any of the signals, due to the simultaneous callings, the central office cannot return a confirmation signal. Accordingly, the central office returns no signal or any demand for retransmission of the data. In such a case, the calling from the terminal station cannot be completed by one calling, so that the calling must be repeated until the calling is completed as a transmission of data. When the repeating method is not appropriate, a plurality of the terminal stations which simultaneously call the first time in the repeated calling can again be in the condition of simultaneous callings, whereby the transmission of the data is not finished, thereby causing much trouble.

Accordingly, an object of the invention is to prevent such trouble so as to accurately finish all transmission of data from the terminal stations without simultaneous callings by the other stations within several repeating callings.

Figure 2:
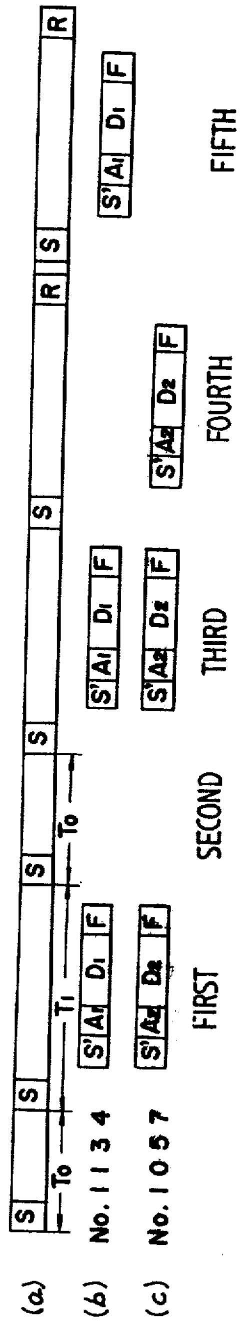
FIG. 2 is a diagram showing the time relationship of data transmitted between terminal stations and a central office in the data transmission system according to the present invention.

Referring now to FIG. 2, there is illustrated an embodiment which attains the foregoing object of the invention. The central office transmits a synchronizing signal S having a specific length and the specific bit pattern shown in FIG. 2a, for a specific time period To. When no transmission is forthcoming from the terminal station, synchronizing signal S will be accurately transmitted. When the terminal station detects the synchronizing signal S, the data which is input and stored in the buffer memory of the like will be transmitted.

During the time the central office is receiving the data or the other signal, the next synchronizing signal S will not be originated. The data transmitted by the terminal station comprises the synchronizing signal S, the terminal station address A, the data D and a finish signal F. When the line from the central office (i.e. the line or frequency channel) is different than the line from the terminal station, the synchronizing signals S and S' can be the same bit length and pattern. When the lines are the same, the synchronizing signals should have different patterns or different lengths.

When the central office receives accurate data (some check bits for error detection are combined in the signal and any error is usually detected) a confirmation signal R is returned. When the terminal station accurately receives the confirmation signal, it is understood that the data transmitted from its own station was accurately received by the central office. In such a case, there exists a certain probability that a plurality of terminal stations simultaneously provided inputs and detected the synchronizing signal and thus transmitted data.

In accordance with this invention, a second data transmission is originated with a different time delay from the first terminal station and the second station, and the different time delay operation is repeated to prevent simultaneous callings from a plurality of terminal stations. This method of transmitting data according to the condition of "different time delay" can be performed by the following various methods.

I. Method of Providing A Different Time Delay Corresponding to the Address Number of the Terminal Station.

As one embodiment, data is transmitted by receiving the next synchronizing signal when the specific figure of the address number is 0. The data is transmitted by receiving the second synchronizing signal when the specific figure of the address number is 1, and data is transmitted by receiving the $(k + 1)$th synchronizing signal when the specific figure of the address number is $k$.

II. Method of Setting Pattern of PN-sequence in Initial Condition Corresponding to the Number of Each Terminal Station.

A random time delay is given to each of the terminal stations by a pseudonoise pulse sequence (PN-sequence).

III. Method of Providing Complete Random Time Delay to Each Terminal.

One embodiment of method (I) will be illustrated in detail while referring to FIG. 2 wherein the reference (a) designates transmitted data in the central office, (b) designates transmitting data in the terminal station No. 1134; and (c) designates transmitting data in the terminal station No. 1,057. In FIG. 2, the terminal stations No. 1,134 and No. 1,057 are considered to be simultaneously transmitting for the first time at the time of receiving the "first" synchronizing signal. Since the first figures of both of the terminal stations are "1", the data will not be retransmitted by the "second" synchronizing signal, but the data will be transmitted by detecting the "third" synchronizing signal in simultaneous callings. The central office cannot accurately receive the data in the simultaneous callings occurring after the third synchronizing signal, so that a confirmation signal will not be returned.

Note, however, that the second figure of No. 1134 is 1 and the second figure of No. 1057 is 0, thus, in accordance with the above formula for the time delay, the data from station No. 1134 will be retransmitted upon reception of the second succeeding synchronizing signal ($k = 1$), whereas the data from station No. 1057 will be retransmitted upon reception of the first succeeding synchronizing signal ($k = 0$). Accordingly, the terminal station No. 1057 transmits its data upon reception of the "fourth" synchronizing signal; however, the terminal station No. 1134 will not now transmit its data. The station No. 1057 receives a confirmation signal so that its retransmitting operation will be stopped. The station No. 1134 retransmits its data upon reception of the "fifth" synchronizing signal S. Since the station numbers are dissimilar, when the operation is repeated for a number of figures, simultaneous callings can be prevented between the stations. In such a case, each of the terminal stations under the simultaneous callings retransmit their data under a time delay corresponding to each address numeral from a common time whereby the simultaneous callings can be absolutely prevented.

Referring to the synchronizing signal, the following methods can be considered:

1. Transmitting the synchronizing signal S with a constant interval $T_0$ when there is no calling from the terminal station and with an interval $T_1$ corresponding to a data length when receiving the data.
2. Transmitting the synchronizing signal S with an appropriate interval T which is longer than the interval for the longest data.

In the latter method, the line efficiency is low when the data lengths fluctuate.

It is also possible to consider a method of preventing simultaneous callings by providing the above-mentioned time delay when simultaneous calling stations are present in the case of discretional calling of the terminal station without transmission of the synchronizing signal from the central office. In such a case, even though only a part of the data transmissions are simultaneously received from a plurality of the terminal stations, the simultaneous callings are given to the central office. Accordingly, when the data length is long, the probability of simultaneous callings are disadvantageously increased.

Figure 3:
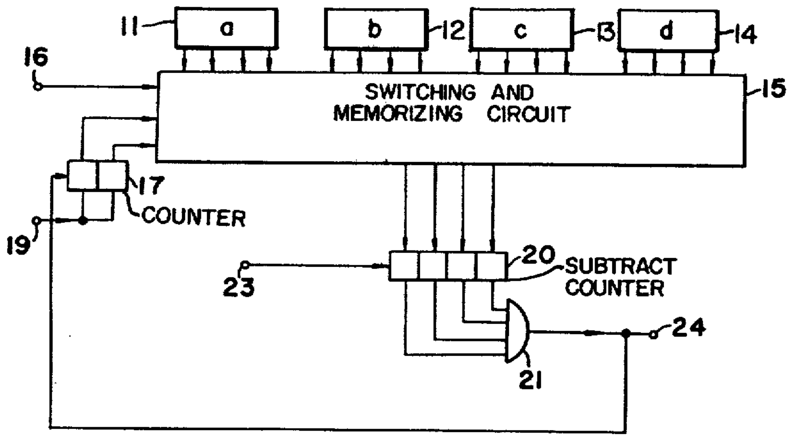
FIGS. 3, 4 and 5 are block diagrams of different preferred embodiments of time delay control circuits according to the present invention.

In accordance with the invention, a circuit for controlling the time delay is combined in the control circuit 2 of FIG. 1. FIG. 3 is one embodiment of such a circuit for controlling the time delay, wherein the reference numerals 11 – 14 designate address memories. For example, when an address of one terminal station is shown as *abcd* in a four figure decimal system, *a* is stored in the memory 11; *b* is stored in the memory 12; *c* is stored in the memory 13; and *d* is stored in the memory 14. When the decimal number is given in BCD (binary decimal system) codes 4-bit outputs are yielded from each memory as shown in FIG. 3, wherein the reference numeral 15 designates a switching and storing circuit; 16 designates a store pulse input terminal, 17 designates a 2-bit counter; 19 designates a reset pulse input terminal; 23 designates a subtract pulse input terminal; and 24 designates a retransmission instruction output terminal.

The switching and memorizing circuit 15 converts the inputs of memories 11, 12, 13 and 14 to the output corresponding to "00" "01" "10" and "11" for the input of the 2-bit counter 17, and when the store pulse is received from the terminal 16, the output is stored in the subtract counter 20. When *a* is stored in the subtract counter, the values of the subtract counter 20 are decreases, as $a-1$, $a-2$, . . . , at each reception of a subtract pulse from the terminal 23. When $(a + 1)$ pulses are received, the counter will read "1111" by an underflow. The output of AND circuit 21 is then converted from 0 to 1, and is transmitted as the retransmission instruction signal from the terminal 24 whereupon simultaneously the counter 17 advances 1 count.

Initially, counter 17 is set at 00, and accordingly, the input from the memory 11 is connected to the output of the switching and memorizing circuit 15. For example, in the terminal station having the address No. 1134, the count is 1, i.e. "0001". When the first transmission is completed, the store pulse is added to the terminal 16 so as to store 0001 in the subtraction counter 20.

When no confirmation signal R is received in response to the calling, each one of the subtract pulses is added to the terminal 23 each time the synchronizing signal S is received. When the second synchronizing signal S is received, the subtract counter 20 converts to 1111, and the retransmission instruction is transmitted from the terminal 24 so as to retransmit the data S'-$A_1$-$D_1$-F, and the counter 17 advances to 01.

When the retransmission is completed, the store pulse is added to the terminal 16 so that the contents b of the memory 12 is stored in the subtract counter 20. Thus, the references *a*, *b*, *c*, *d*, *a*, *b*, . . . will be sequentially stored in the subtract counter 20 until a confirmation signal is received for the transmission of data. Thus, a time delay control of the transmission is accomplished so as to perform the retransmission in the time delay for receiving synchronizing signals S of $(a + 1)$, $(b + 1)$, $(c + 1)$ ...... sequentially, corresponding to the memorys.

When the confirmation signal R is received, a reset pulse is applied to the terminal 19 so as to reset the counter 17 to 00 as its initial condition. The application of a pulse to the terminal 23 is halted at each reception of the synchronizing signal S.

Figure 4:
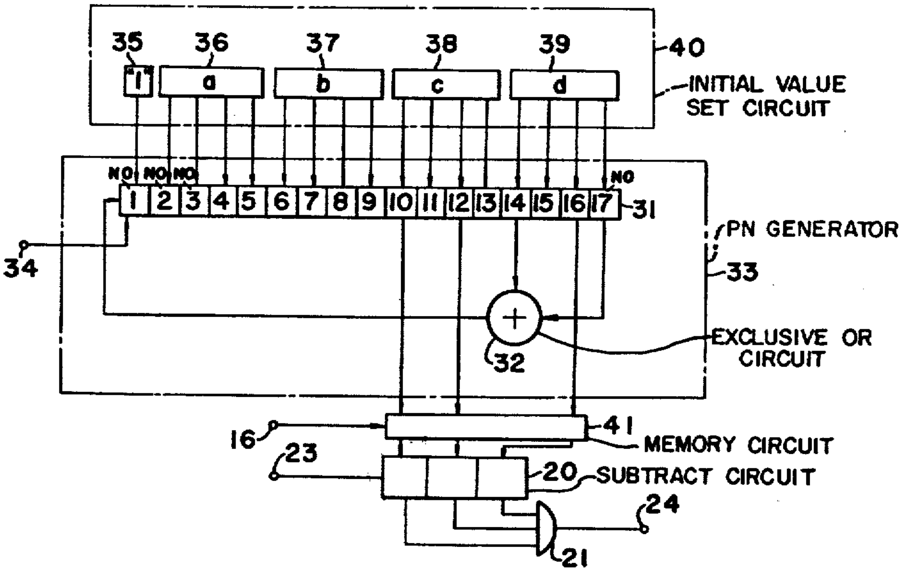

FIG. 4 shows one embodiment of a circuit controlling the time delay in the case of method II above using PN-sequence to provide a random time delay to each terminal station. In FIG. 4, the reference numeral 31 designates a 17-step shift register having 17 flip-flops; 32 designates an "EXCLUSIVE OR" circuit; 33 designates a PN generator; 34 designates a shift pulse input terminal; 40 designates an initial value set circuit for the shift register 31 which comprises set circuits 35, 36, 37, 38 and 39; and 41 designates a memory circuit. The reference numerals 16, 20, 21, 23 and 24 correspond to those parts as shown in FIG. 3.

In operation, when the 17th output and the 14th output of 17-step shift register 31 are passed through the EXCLUSIVE OR circuit 32, they are added in mod. 2 and the product is fed back to the first step, and the P-N generator 33 having a period of $2^{17} - 1$ is formed. The shift register 31 is shifted by the shift pulse applied from the terminal 34 whereby the flip-flops of each step are converted to pesudo-random. The initial value of the shift register 31 is set in a specific constant initial value (which is different in each of terminal stations) by the initial value set circuit 40. For example, when the address of the terminal station designates *abcd*, the set circuit 36 sets the second through fifth steps of the shift register 31 in BCD (binary decimal system) code corresponding to *a*; the set circuit 37 sets the sixth through ninth steps of the shift register 31 in BCD code corresponding to *b*; the set circuit 38 sets the tenth through thirteenth steps of the shift register 31 in BCD code corresponding to *c*; the set circuit 39 sets the fourteenth through seventeenth steps of the shift register 31 in BCD code corresponding to *d*; and the set circuit 35 sets the first step in the shift register 31 to 1.

During the time of transmission of the first data by the calling from the terminal apparatus, a specific number of shift pulses are applied to the terminal 34. When the transmission of data is completed, the store pulse is applied to the terminal 16 so that the predetermined contents, e.g. 3 bits, of the shift register 31 is stored through the memory circuit 41 to the subtract counter 20. When no confirmation signal R is received (similar to the embodiment of FIG. 3), each of the subtract pulses is applied to the terminal 23 for each reception of the synchronizing signal S. When the subtract counter is in an under-flow condition so as to form 1111, the retransmission instruction is transmitted from the terminal 24 through AND circuit 21, whereby the retransmission can be delayed until receiving $(x + 1)$ synchronizing signals S when the value stored in the subtract counter 20 is $x$ ($x = 0 - 7$ in 3 bits).

In the retransmission, a specific number of shift pulses are applied to the terminal 34, and the above-mentioned operation is repeated until the confirmation signal R is received. When the confirmation signal R is received, the initial value set circuit 40 is reactuated to return the shift register 31 to its original condition. Thus, the time delay is irregularly changed by one receiver and a different change is given between different terminal stations so that continuous simultaneous callings from a plurality of terminal stations can be attained.

Figure 5:
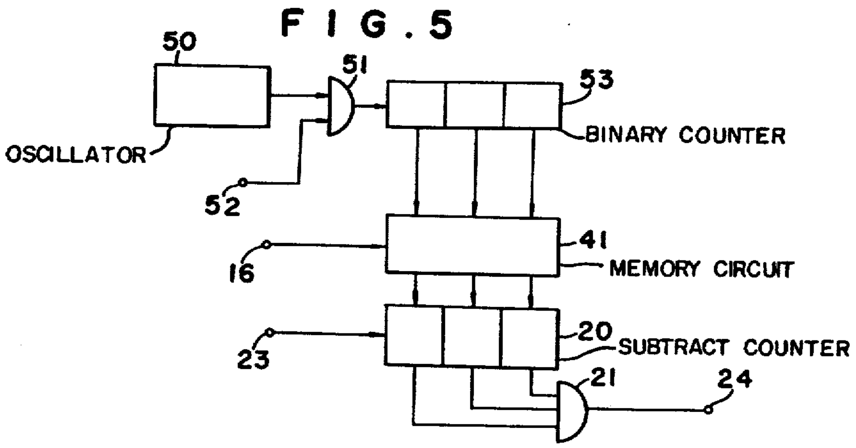

Referring now to FIG. 5, there is shown one embodiment of a circuit for controlling the time delay in the case of method III above which provides random time delay to each terminal station. In FIG. 5, the reference numeral 50 designates an oscillator having inferior frequency stability such as a multi-vibrator; 51 designates a gate circuit; 52 designates a gate signal input terminal; 53 designates a binary counter having three bits; and the reference numerals 41, 16, 20, 21, 23 and 24 correspond to those parts as shown in FIG. 4.

In operation, during the time of transmission of data from the terminal station, the code 1 is applied to the gate signal input terminal 52, so that the gate 51 is turned on. The output of the oscillator 50 is applied through the gate 51 to the counter 53. When the frequency of the oscillator 50 is high, it overflows the counter 53 for more than several thousands times during the time of reception of the data. The frequency stability of the oscillator 50 is inferior, and accordingly the value of the counter 53 is completely random when the input to the terminal 52 is 0 after transmitting the data to turn off the gate 51. The store pulse is applied to the terminal 16 so as to store the value of the counter 53 in the subtract counter 20 subsequent to the transmission of data and the turning off of gate 51. Thereafter, similar to the embodiment of FIG. 4, the time delay for the retransmission of data is controlled when the confirmation signal R is not received. In accordance with the foregoing operation, the time delay can be independently and irregularly changed in each terminal station and continuous simultaneous callings from a plurality of terminal stations can be prevented.

In the above embodiments, the time delay is controlled by using the synchronizing signal S originated from the central office. However, it is possible to apply the invention to a system wherein any periodic synchronizing signal is not originated from the central office. In the latter case, a pulse having a period T applied to the subtraction pulse input terminal 23 can be originated in the terminal station. (However, the period T will be slightly longer than the longest data length.)

As stated above, in accordance with the invention, when a plurality of the terminal stations randomly call by using a common transmission line or channel, the trouble involving simultaneous callings from a plurality of the terminal stations (which is formed according to some probability) can be easily dissolved with a simple apparatus so that effective utilization of the transmission line can be attained.

Obviously, numerous modifications and variations of the present invention are possible in light of the above teachings. It is therefore to be understood that within the scope of the appended claims the invention may be practice otherwise than as specifically described herein.

What is claimed as new and desired to be secured by Letters Patent of the United States is:

1. A method for transmitting data from a plurality of terminal stations to a central office by using a common line or channel, wherein more than one of said terminal stations simultaneously transmit data to said central office, comprising the steps of:

retransmitting said data after a time delay which is respectively controlled to be variable at every retransmission of each of said simultaneously transmitting terminal stations;

transmitting a confirmation signal from said central office in response to an accurate receipt of data transmitted from a terminal station; and, ceasing said retransmission of said data from one of said terminal stations upon the receipt thereof of a confirmation signal from said central office signifying the accurate receipt of said data from said station by said central office.

2. The data transmitting method of claim 1, wherein said time delay which is randomly controlled at every retransmission corresponds to the output of a random code generator in each of said terminal stations.

3. A data transmitting device in a terminal station in a system which comprises a plurality of terminal stations, which comprises:

means for transmitting data;

means for initiating retransmission of data after a time delay when no confirmation signal informing accurate receipt thereof is obtained; and means for controlling to be variable said time delay at every retransmission.

4. The data transmitting device according to claim 3 wherein said device comprises a pseudo-noise pulse generator whose initial condition is determined according to an address numeral of the terminal station, and wherein said time delay which is randomly controlled at every retransmission is determined according to said pseudo-noise pulse generator.

5. The data transmitting device according to claim 3 wherein said device comprises a random code generator and wherein said time delay which is randomly controlled at every retransmission is determined according to the output of said random code generator.

6. A method for transmitting data from a plurality of terminal stations to a central office by using a common line or channel, wherein more than one of said terminal stations simultaneously transmit data to said central office, comprising the steps of:

retransmitting said data at different times from said simultaneously transmitting terminal stations;

transmitting a confirmation signal from said central office in response to an accurate receipt of data transmitted from a terminal station;

originating a pseudo-noise pulse having a period long compared to the number of terminal stations;

setting the initial condition of a PN generator for originating said psuedo noise pulse in each of said terminal stations corresponding to the address number of each terminal station; and generating said retransmission of data according to time delays at each of said terminal stations corresponding to the condition of said PN generator in each of said terminal stations.

7. A data transmission system for transmitting data from a plurality of terminal stations to a central office by using a common line or channel, which comprises:

means for returning a confirmation signal from said central office to one terminal station when said central office received data from said terminal station without error;

means for retransmitting the data from said terminal stations when a plurality of terminal stations transmit data but no confirmation signal is returned to any of the terminal stations; and means for initiating retransmission of data at different times from the plurality of terminal stations when said plurality of terminal stations initiate retransmission, wherein all of said terminal stations each comprise a PN generator for initiating pseudo-noise pulses having a long period compared to the number of terminal stations wherein the initial condition of each of said generators is determined depending upon the address numeral of its corresponding terminal station and wherein said terminal stations initiate retransmission after a time delay corresponding to the condition of its respective PN generator.

8. A data transmission system for transmitting data from a plurality of terminal stations to a central office by using a common line or channel, which comprises:

means for returning a confirmation signal from said central office to one terminal station when said central office receives data from said terminal station without error;

means for retransmitting the data from said terminal stations when a plurality of terminal stations transmit data but no confirmation signal is returned to any terminal station; and means for initiating a retransmission of data at different times from the plurality of terminal stations when said plurality of terminal stations initiate retransmission, wherein each of said terminal stations comprises a random code generator wherein said terminal stations initiate retransmission after a time delay corresponding to the output of its respective random code generator.

9. A data transmitting device in a terminal station in a system which comprises a plurality of terminal stations, which includes:

means for transmitting data;

means for initiating retransmission of data when no confirmation signal informing accurate receipt thereof is obtained; and means for initiating retransmission of data in an inherent time sequence for each of said plurality of terminal stations, wherein said device comprises a pseudo-noise pulse generator whose initial condition is determined according to an address numeral of a terminal station, and wherein said time sequence is determined according to said pseudo-noise pulse generator.

10. A data transmitting device in a terminal station in a system which comprises a plurality of terminal stations, which includes:

means for transmitting data;

means for initiating retransmission of data when no confirmation signal informing accurate receipt thereof is obtained; and means for initiating retransmission of said data in an inherent time sequence for each of said plurality of terminal stations, wherein said device comprises a random code generator and wherein said time sequence is determined according to the output of said random code generator.

11. A method for transmitting data from a plurality of terminal stations to a central office by using a common line or channel, wherein more than one of said terminal stations simultaneously transmit data to said central office, comprising the steps of:

retransmitting said data after a time delay which is variably respectively controlled at every retransmission of each of said simultaneously transmitting terminal stations;

transmitting a confirmation signal from said central office in response to an accurate receipt of data transmitted from a terminal station;

ceasing said retransmission of said data from one of said terminal stations upon the receipt thereof of a confirmation signal from said central office signifying the accurate receipt of said data from said station by said central office;

the time delay being variably controlled at every retransmission corresponding to the address numeral of each of said terminal stations.

12. A method for transmitting data from a plurality of terminal stations to a central office by using a common line or channel, wherein more than one of said terminal stations simultaneously transmit data to said central office, comprising the steps of:

retransmitting said data after a time delay which is variably respectively controlled at every retransmission of each of said simultaneously transmitting terminal stations;

transmitting a confirmation signal from said central office in response to an accurate receipt of data transmitted from a terminal station;

ceasing said retransmission of said data from one of said terminal stations upon the receipt thereof of a confirmation signal from said central office signifying the accurate receipt of said data from said station by said central office;

each of said terminal stations comprising a PN generator for originating a pseudo-noise pulse having a long period compared to the number of terminal stations wherein the initial condition of said PN generator in each of said terminal stations is set corresponding to the address number of each terminal station:

said time delay which is randomly controlled at every retransmission corresponding to the condition of said PN generator in each of said terminal stations.

13. A data transmitting device in a terminal station in a system which comprises a plurality of terminal stations which comprises:

means for transmitting data:

means for initiating retransmission of data after a time delay when no confirmation signal informing accurate receipt thereof is obtained;

means for variably controlling said time delay at every retransmission;

said time delay being variably controlled at every retransmission according to the address numeral of each respective terminal station.

14. A data transmission system for transmitting data from a plurality of terminal stations to a central office by using a common line or channel, which comprises:

means for returning a confirmation signal from said central office to one terminal station when said central office receives data from said terminal station without error;

means for retransmitting the data from said terminal stations after a time delay when a plurality of terminal stations transmit data but no confirmation signal is returned to any of the terminal stations;

means for variably controlling said time delay at every transmission of each of said terminal stations;

the time delay which is variably controlled at every retransmission corresponding to each address numeral of each terminal station.

15. A data transmission system for transmitting data from a plurality of terminal stations to a central office by using a common line or channel, which comprises:

means for returning a confirmation signal from said central office to one terminal station when said central office receives data from said terminal station without error;

means for retransmitting the data from said terminal stations after a time delay when a plurality of terminal stations transmit data but no confirmation signal is returned to any of the terminal stations;

means for variably controlling said time delay at every transmission of each of said terminal stations;

each of said terminal stations comprising a PN generator for originating pseudo-noise pulses having a long period compared to the number of terminal stations, wherein the initial condition of each of said generators is determined depending upon the address numeral of its corresponding terminal station and wherein said time delay which is randomly controlled at every retransmission corresponds to the condition of its respective PN generator.

16. A data transmission system for transmitting data from a plurality of terminal stations to a central office by using a common line or channel, which comprises:

means for returning a confirmation signal from said central office to one terminal station when said central office receives data from said terminal station without error;

means for retransmitting the data from said terminal stations after a time delay when a plurality of terminal stations transmit data but no confirmation signal is returned to any of the terminal stations;

means for controlling to be variable said time delay at every transmission of each of said terminal stations.

17. The data transmitting system of claim 8 wherein each of said terminal stations comprise a random code generator wherein said time delay which is randomly controlled at every retransmission corresponds to the output of its respective random code generator.

18. A method of transmitting data from a plurality of terminal stations to a central office by using a common line or channel, wherein more than one of said terminal stations simultaneously transmit data to said central office, comprising the steps of:

retransmitting said data at time delays controlled to be variable from said simultaneously transmitting terminal stations;

transmitting a confirmation signal from said central office in response to an accurate receipt of data transmitted from a terminal station;

initiating said retransmission at time delays controlled to be variable corresponding to the output of a random code generator in each station;

ceasing said retransmission of said data from one of said terminal stations upon the receipt thereof of a confirmation signal from said central office signifying the accurate receipt of said data from said station by said central office.

* * * * *